United States Patent
do Couto Fraga et al.

(10) Patent No.: US 12,043,800 B2
(45) Date of Patent: Jul. 23, 2024

(54) PROCESS FOR PRODUCING CRUDE BIO-OIL FROM BIOMASS WITH A HIGH MOISTURE CONTENT AND CATALYST FOR HYDROTHERMAL LIQUEFACTION OF STREAMS OF BIOMASS WITH A HIGH MOISTURE CONTENT

(71) Applicant: Petróleo Brasileiro S.A.—Petrobras, Rio de Janeiro (BR)

(72) Inventors: Adriano do Couto Fraga, Rio de Janeiro (BR); Andrea de Rezende Pinho, Rio de Janeiro (BR); Marlon Brando Bezerra de Almeida, Rio de Janeiro (BR); Vitor Loureiro Ximenes, Rio de Janeiro (BR)

(73) Assignee: Petróleo Brasileiro S.A.—Petrobras (BR)

( * ) Notice: Subject to any disclaimer, the term of this patent is extended or adjusted under 35 U.S.C. 154(b) by 150 days.

(21) Appl. No.: 17/779,519

(22) PCT Filed: Nov. 17, 2020

(86) PCT No.: PCT/BR2020/050476
§ 371 (c)(1),
(2) Date: May 24, 2022

(87) PCT Pub. No.: WO2021/102534
PCT Pub. Date: Jun. 3, 2021

(65) Prior Publication Data
US 2023/0026701 A1    Jan. 26, 2023

(30) Foreign Application Priority Data
Nov. 25, 2019    (BR) .................. 10 2019 024835 1

(51) Int. Cl.
*C10G 1/08*    (2006.01)
*B01J 23/04*    (2006.01)
(Continued)

(52) U.S. Cl.
CPC .............. *C10G 1/086* (2013.01); *B01J 23/04* (2013.01); *B01J 37/088* (2013.01); *C10G 3/44* (2013.01);
(Continued)

(58) Field of Classification Search
CPC ... B01J 21/18; B01J 23/04; B01J 23/92; B01J 37/084; B01J 37/088; C07C 67/03;
(Continued)

(56) References Cited

U.S. PATENT DOCUMENTS 2,177,557 A    10/1939    Bergstrom et al.

FOREIGN PATENT DOCUMENTS

RU    2668423 C1    10/2018
WO    2018076093 A1    5/2018

OTHER PUBLICATIONS

Machine translation of Chen et al (CN 115881991). (Year: 2023).*
(Continued)

*Primary Examiner* — Brian A McCaig
(74) *Attorney, Agent, or Firm* — Mintz, Levin, Cohn, Ferris, Glovsky and Popeo, P.C.

(57) ABSTRACT

The present invention addresses to a hydrothermal liquefaction process capable of generating a liquid stream, rich in renewable molecules, with lower oxygen content, lower percentage of water and lower acidity compared to other products of thermochemical processes of biomass conversion. In order to effectively carry out this process, a catalyst was developed, obtained from the calcination of castor bean hull, to be used in the field of biofuels in order to provide an
(Continued)

environmentally friendly alternative for the production of fuels.

19 Claims, 1 Drawing Sheet

(51) Int. Cl.
    *B01J 37/08*     (2006.01)
    *C10G 3/00*     (2006.01)
    *C10G 1/00*     (2006.01)

(52) U.S. Cl.
    CPC ..... *C10G 1/002* (2013.01); *C10G 2300/1014* (2013.01); *C10G 2300/4081* (2013.01)

(58) Field of Classification Search
    CPC ......... C07C 69/66; C10B 53/02; C10G 1/002; C10G 1/086; C10G 3/44; C10G 3/50; C10G 2300/1014; C10G 2300/4081; C11B 1/04; Y02E 50/10; Y02P 20/582; Y02P 30/20
    See application file for complete search history.

(56) References Cited

OTHER PUBLICATIONS

Chen et al. (Dec. 2018) "Catalytic Hydrothermal Liquefaction of Microalgae Over Metal Incorporated Mesoporous SBA-15 with High Hydrothermal Stability", Carbon Resources Conversion, 1(3):251-259.

Davidson et al. (Nov. 2019) "Strategies To Valorize the Hydrothermal Liquefaction-Derived Aqueous Phase into Fuels and Chemicals", ACS Sustainable Chemistry & Engineering, 7:19889-19901.

Sanchez-Cantu et al. (Sep. 11, 2017) "Effect of the Activation Temperature Over Activated Carbon Production from Castor Cake and its Evaluation as Dye Adsorbent", International Journal of Environmental Science and Technology, 15:1521-1530.

Yan et al. (Mar. 2019) "Hydrothermal Liquefaction of Ulva Prolifera Macroalgae and the Influence of Base Catalysts on Products", Bioresource Technology, 292:121286(35 pages).

\* cited by examiner

PROCESS FOR PRODUCING CRUDE BIO-OIL FROM BIOMASS WITH A HIGH MOISTURE CONTENT AND CATALYST FOR HYDROTHERMAL LIQUEFACTION OF STREAMS OF BIOMASS WITH A HIGH MOISTURE CONTENT

CROSS-REFERENCE TO RELATED APPLICATIONS

This application is a national phase application, filed under 35 U.S.C. § 371, of PCT International Patent Application No. PCT/BR2020/050476, filed Nov. 17, 2020, and claims benefit of and priority to Brazilian application BR 10 2019 024835 1, filed on Nov. 25, 2019, the disclosures of all of which are incorporated herein by reference in their entirety.

FIELD OF INVENTION

The present invention addresses to a hydrothermal liquefaction process capable of generating a liquid stream, rich in renewable molecules, with lower oxygen content, lower percentage of water and lower acidity compared to other products of thermochemical processes of biomass conversion. To carry out said process effectively, a catalyst was developed from the calcination of castor bean hull, to be used in the field of biofuels in order to provide an environmentally friendly alternative for the production of biofuel from biomass with high moisture content.

DESCRIPTION OF THE STATE OF THE ART

Currently, we use energy to generate lighting, move machinery and equipment, control the temperature producing heat or cold, and speed up communications. Our production, locomotion, efficiency, safety and comfort depend on energy, in addition to other factors associated with living in society in the manner of the $21^{st}$ century.

The counterpart of the benefits provided by technological development is the constant growth of energy consumption. To meet the demand, governments increasingly invest in the construction of power generation plants, transmission and distribution lines, with serious environmental damage.

The severity of environmental impacts will largely depend on the energy source used to generate electricity. The use of non-renewable sources, such as oil, natural gas, mineral coal and uranium, is associated with greater environmental risks, both locally and globally.

In this way, global warming, caused by the greenhouse effect, largely caused by gases from the burning of fossil fuels, has been blamed for these deleterious effects, which include desertification and rising of sea levels.

In this context, the world dependence on fossil energy sources has been provoking intense movements for the creation of legislation that acts in two aspects: on the one hand, laws are created and benefits are granted for the use of biofuels, or renewable energies; on the other hand, energy sources with greater polluting potential are taxed and their use is discouraged.

In this scenario, the use of biofuels has been boosted all over the world, among which, thermochemical technologies, which have as main advantage the integral conversion of all fractions of biomass into final products.

Among thermochemical technologies, liquefaction has been achieving highlight because it uses solvents in sub or supercritical conditions to promote the solvolysis of biomass, generating a liquid stream called bio-oil (bio-crude or HTLO). The conditions employed depend on the solvent used; when the solvent is water, the known technology is hydrothermal liquefaction (HTL).

Hydrothermal liquefaction (HTL) is an important thermochemical conversion process that is used to convert raw materials with high moisture content, such as lignocellulosic material and aquatic biomass, into added value chemicals. As mentioned, this process is environmentally attractive because it is normally carried out in the presence of water (solvent) at temperatures between 250 to 374° C. and pressures of 4 to 22 MPa.

Among the advantages associated with this technology, it is worth to mention that hydrothermal liquefaction has the ability to promote the conversion of raw materials with high moisture content without the need for prior drying. Another point to be highlighted is that hydrothermal liquefaction allows the production of a bio-oil with lower levels of acidity, water and oxygen when compared to the bio-oil from the fast pyrolysis process. These features are especially interesting for the inclusion of this product in the conventional oil refining scheme, which can enable the production of fuels with renewable content in oil refineries.

The hydrothermal liquefaction process promotes the conversion of biomass into four product fractions with distinct characteristics. The bio-oil; a gaseous fraction, formed mostly by $CO_2$ and to a lesser extent by CO; a solid fraction known as char, with a high concentration of carbon; and an aqueous fraction containing oxygenated products.

For energy production, the main product of interest is bio-oil, which can be used directly as a fuel to replace fossil fuel oil.

U.S. Pat. No. 2,177,557 describes the process of hydrothermal liquefaction of biomass by using water at temperatures of 220° C. to 360° C. in a reducing atmosphere, with calcium salts as catalysts.

In later stages of the technology, the PERC (Pittsburgh Energy Research Center) and LBL (Lawrence Berkeley Laboratory) processes were developed, which reached the pilot scale. In both the described processes, a reducing atmosphere containing CO and $H_2$ generated by biomass gasification was used.

In the process described by the Pittsburgh Energy Research Center, a slurry formed by comminuted wood, oil and water were continuously pumped through a tubular reactor at temperatures of 330° C. to 370° C., residence times of 10 to 30 min and pressure of 200 bar (20 MPa), sodium carbonate (5%) was used as a catalyst, and 40 to 55% oil yields were obtained. In turn, the Lawrence Berkeley Laboratory process used only water as a solvent. This process was initiated by hydrolysis with sulfuric acid at 180° C., followed by neutralization with sodium carbonate.

Continuously with the deployment of this technology, the HTU (Hydrothermal upgrading) process was developed, which operates in two steps, the first being a pre-digestion of the biomass with water at 200° C. and 30 bar (3 MPa) forming a paste, which is then subjected to temperatures of 330° C., pressures of 200 bar (20 MPa) and residence time of 8 min.

Likewise, document WO2018076093 describes a process based on hydrothermal liquefaction treatment for co-processing sludge and other lignocellulosic biomass for co-production of biogas and bio-crude oil. The treatment of sludge and biomass residues is carried out using KOH (potassium hydroxide) as a catalyst. Thus, although the described process is apparently advantageous, the use of said catalyst makes the process so expensive that its commercial use becomes impaired.

Thus, there still remains to be proposed a liquefaction route suitable for typically Brazilian biomass, such as sugarcane bagasse. For this purpose, it is also necessary to propose a catalyst that allows the production of a stream suitable for co-processing with fossil streams in petroleum refining and that presents characteristics compatible with large-scale processing. In this way, a low-cost catalyst was identified, obtained from a residue and that still presents high activity for hydrothermal liquefaction and high solubility in water, thus allowing the recycling of the generated aqueous fraction. These characteristics allow the proposition of a single process scheme that employs such a catalyst and allows, by means of the recycling of the produced aqueous fraction, the reintroduction of the catalytic system in the process, allowing the reduction of water and catalyst consumption and, concomitantly, an increase in the yield of bio-oil obtained from sugarcane bagasse.

Thus, differently from the other processes described, the present invention proposes an alternative process of hydrothermal liquefaction, without mandatory reducing atmosphere, by using a catalyst generated from a biomass residue, with reduced consumption of water and high yield of bio-oil.

BRIEF DESCRIPTION OF THE INVENTION

The present invention addresses to a process of hydrothermal liquefaction of biomass capable of generating a liquid stream rich in renewable molecules, called bio-crude (or bio-oil), with lower oxygen content, lower percentage of water and lower acidity compared to other thermochemical biomass conversion products and processes, such as fast pyrolysis.

This feature facilitates the co-processing of this product in typical oil refinery processes, enabling the obtainment of renewable streams that can be used for the formulation of fuels from Otto, Diesel, and Brayton cycle using already-existing assets in refining schemes.

Said process exposes a lignocellulosic biomass in aqueous medium to pre-determined conditions of temperature, pressure, and residence time with the use of a catalyst obtained from a biomass residue, which presents adequate characteristics to improve the efficiency of the hydrothermal liquefaction process.

The use of said catalyst promotes the increase of the bio-oil yield by at least 30% compared to the non-catalyzed process. In addition, the process is characterized by the recycling of the generated aqueous fraction, which contains the catalyst and some oxygenated products, so that the need for water replacement for the process is minimized, and, further, that the catalytic activity is maintained, with concomitant reincorporation of oxygenated compounds to the reaction medium, which results in an increase in the bio-oil yield.

In this way, the process in practice exposes a lignocellulosic biomass in an aqueous medium to predetermined conditions of temperature, pressure and residence time. The process uses a catalyst obtained from a biomass residue, which has suitable characteristics to improve the bio-oil yield by at least 30% compared to the non-catalyzed process.

The process is carried out by recycling the generated aqueous fraction, which contains the catalyst and some of the oxygenated products, so that the need for water replacement for the process is minimized, and that the catalytic activity is maintained, with concomitant incorporation of oxygenated compounds to the reaction medium, which results in an increase in the bio-oil yield.

The biomass used as raw material can be any lignocellulosic material; lignin obtained from sugarcane bagasse by means of an acid hydrolytic process; any fatty material; any proteinaceous material; or even a mixture of two or more materials of those described above.

It should be emphasized that the catalyst is obtained from castor bean hull (epicarp+mesocarp), has a high content of alkali metals (>50%) and high solubility in water, which makes its reuse possible and allows the process to recycle all the aqueous fraction formed. The reuse of the catalyst combined with the use of the formed aqueous fraction drastically reduces the consumption of water and increases the yield of bio-oil by reincorporating the soluble oxygenated products in the aqueous fraction to the reaction medium, in addition to the reinsertion of the catalyst in the same.

Still with respect to the catalyst, it should be highlighted that it is obtained by means of a calcination process at 600° C. of the residue from the production of castor bean oil, known as castor bean hull (epicarp+mesocarp). This fraction is a residue containing approximately 7% of inorganics in its composition.

Thus, by means of the calcination of castor bean hull, under certain conditions, it is possible to obtain a product with a high content of alkali metals. The calcination can be carried out to obtain the catalyst or to generate steam, in boilers, the catalyst being obtained as a by-product of steam generation.

Therefore, said catalyst is a solid, easy to handle, non-toxic, with low production cost and high water solubility, which makes its reuse possible and provides a performance similar to that of pure compounds (PA reagents) of reference.

Additionally, the catalyst in practice is obtained from biomass, which configures another advantage in relation to the environmental aspect, since it values a residue and minimizes the need for adequate disposal of the castor bean hull.

In the proposed liquefaction process, the generated aqueous stream preserves the catalytic function due to the high solubility of the catalyst and also contains oxygenated compounds. This stream is then recycled, thus dramatically reducing the need for water in the process and maintaining catalytic activity. The described process is characterized by liquefaction rates of more than 85% and bio-oil yields of more than 40%.

In the process in practice, the solid residue formed can be burned in boilers, for the generation of energy, or be used as raw material for the generation of adsorbent materials.

Otherwise, the gaseous stream formed can be recycled to the reactor in order to generate a reducing atmosphere, or it can be fully oxidized for the generation of energy. The same stream can still undergo membrane separation processes to obtain syngas ($H_2$+CO) for other applications.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

The present invention proposes an alternative process of hydrothermal liquefaction, without mandatory use of a reducing atmosphere, with the use of a catalyst generated from a residue of a biomass, where said catalyst is produced in order to have useful characteristics for the biomass liquefaction process.

Among these characteristics, there can be highlighted the high content of alkali metals (>50%) and its high solubility in water, which makes its reuse possible and allows the process to recycle the entire formed aqueous fraction, drastically reducing the consumption of water and increasing the yield of bio-oil by the reincorporation of the soluble oxygenated products in the aqueous fraction to the reaction medium, in addition to the reinsertion of the catalyst therein.

The proposed liquefaction process uses a catalyst, described above, at temperatures of 250 to 300° C. and low residence time, 0 (zero) min in a reactor operating in batch mode (heating ramp time only of 40 to 60 min), with pressures of 900 to 1300 psig (6.205 to 8.963 MPa), using 1% to 10% m/m, preferably 5% m/m, of catalyst in relation to the dry biomass mass and solids content of 5 to 20% m/m in the load (dry biomass+water).

In this process, the aqueous stream generated retains the catalytic function obtained by using the catalyst presented above, thanks to its high solubility, and also contains oxygenated compounds. This stream is then recycled, dramatically reducing the need for water in the process and maintaining catalytic activity. The process is characterized by liquefaction rates above 85% and bio-oil yields above 40%.

The solid residue formed in the process (char) can, alternatively, be burned in boilers for energy generation or as raw material for the generation of adsorbent materials.

Also alternatively, the gaseous stream can be recycled to the reactor in order to generate a reducing atmosphere; it can be fully oxidized for energy recovery or it can undergo membrane separation processes to obtain syngas ($H_2$+CO).

The biomass used as raw material can be any lignocellulosic material; lignin, obtained from sugarcane bagasse by means of an acid hydrolytic process; any fatty material; any proteinaceous material; or even a mixture of two or more materials of those described above.

Figure 1:
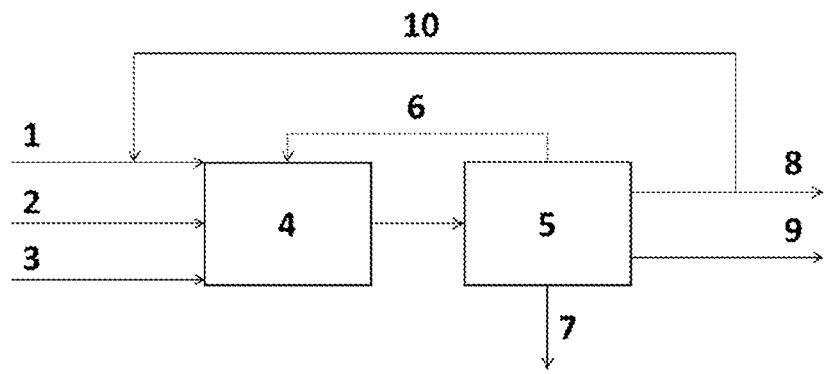
FIG. 1 illustrates a schematic form of the process, in which streams (1), (2), and (3) respectively consists of replacement water, replacement catalyst and biomass that feed the liquefaction reactor (4). After conversion, the products are sent to a separator (5), where the gaseous (6), solid (7), aqueous (8) and oily (bio-crude) (9) streams are separated.

As can be seen in FIG. 1, the schematic form of the proposed liquefaction process includes streams (1), (2) and (3), which consist of replacement water, replacement catalyst and biomass, which feed the liquefaction reactor (4).

After the conversion, the products are sent to a separator (5), where the gaseous (6), solid (7), aqueous (8) and oily (bio-crude) (9) streams are separated.

FIG. 1 also demonstrates that the stream (6) can be optionally recycled to the reactor to maintain a reducing atmosphere. Another option, not shown in FIG. 1, addresses to the fact that the stream (6) can undergo the membrane separation process to obtain syngas for other applications, and in another inventive aspect, the stream (6) can be used for energy generation by means of its total oxidation.

FIG. 1 further addresses to the stream (8) that is recycled (stream 10) in order to reuse the catalyst and reinsert the water-soluble oxygenated compounds into the reaction network.

Another point outlined in FIG. 1 is the direction of the stream (9) to conventional oil refining processes or to treatments aimed at improving the quality of bio-crude.

In addition, the stream (7) can be directed to a boiler in order to generate energy for the process or even be a raw material for the production of adsorbents.

Thus, the present invention addresses to a process to produce crude bio-oil from biomass with high moisture content, which comprises the following steps:

a. Preparing the process feed by mixing water and residual lignocellulosic biomass to form a mixture containing from 5% to 20% by weight of dry biomass; and adding catalyst so that its concentration is from 1 to 10% m/m, in relation to the dry biomass.

b. Hydrothermally liquefying (HTL) the mixture prepared in (a) by heating it to a temperature in the range of 250 to 300° C. at a pressure of 900 to 1300 psig (6.205 to 8.963 MPa).

c. Cooling the mixture after the reaction is complete.

d. Sending the formed products to a separator where the gaseous, solid, oily and aqueous streams, which contain the catalyst, are separated.

e. Recycling the aqueous stream separated in (d) to the beginning of the process, in order to reuse the catalyst and reincorporate the oxygenated compounds into the reaction medium.

In a first aspect, the streams of replacement water, catalyst and biomass feed the liquefaction reactor.

In a second aspect, the oily stream obtained in step (d) consists of a bio-oil.

In a third aspect, the gaseous stream obtained in step (d) can be optionally recycled to the reactor to maintain a reducing atmosphere or undergo a membrane separation process to obtain syngas.

In a fourth aspect, the gaseous stream obtained in step (d) can generate energy by means of its total oxidation.

In a fifth aspect, the aqueous stream obtained in step (d) is recycled in order to reuse the catalyst and reinsert the water-soluble oxygenated compounds into the reaction medium.

In a sixth aspect, the oily stream obtained in step (d) is directed to processing in conventional oil refining units or to units dedicated to the improvement of the quality of bio-crude.

In a seventh aspect, the solid stream obtained in step (d) can be directed to a boiler in order to generate energy for the process or for the production of adsorbents.

In an additional aspect, the biomass content in the biomass+water mixture, described in step (a), is 5 to 20% m/m.

In a second additional aspect, the mentioned process produces an oily liquid stream, rich in renewable molecules, called bio-crude (or bio-oil), with lower oxygen content, lower percentage of water and lower acidity than the bio-crudes produced in thermochemical processes of biomass conversion.

In a third additional aspect, said process comprises a step of recovery and recycling of the catalyst in steps (d) and (e).

In a fourth additional aspect, the biomass is selected from the group consisting of: a biomass of any cellulosic material; lignin obtained from sugarcane bagasse by means of the acid hydrolytic process; any fatty material; any proteinaceous material or the mixture of two or more of the above-described materials.

In the process described above, the catalyst used is a homogeneous catalyst and consists mostly of potassium. The mentioned catalyst is used in a concentration of 1% to 10% w/w, in relation to the total weight of the biomass.

Further, with regard to the process described above, it should be noted that it is carried out by recycling the generated aqueous fraction, which contains the catalyst and some of the oxygenated products, so that the need for water replacement for the process is minimized, and that the catalytic activity is maintained with the concomitant incorporation of oxygenated compounds into the reaction medium, which results in an increase in the bio-oil yield.

In yet another inventive variant, the catalyst for hydrothermal liquefaction of biomass streams is obtained by means of the calcination, in boilers, of residues from the production of castor oil. The calcination is carried out at 600° C. and the castor oil production residues used are castor hull (epicarp+mesocarp).

In this variant, it is worth to note that the catalyst is a solid, easy to handle, non-toxic, with low production cost, reusable, with a high content of alkali metals (>50%) and high solubility in water, which enables its reuse and allows the process to recycle the entire formed aqueous fraction, drastically reducing water consumption and increasing the bio-oil yield by reincorporating the soluble oxygenated products in the aqueous fraction into the reaction medium, in addition to reinserting the catalyst in the same.

In a last inventive variant, the catalyst for hydrothermal liquefaction of biomass streams is defined as a catalyst that has liquefaction rates greater than 85% and oil stream yields greater than 40%, in which said process improves the bio-oil yield by at least 30% compared to the uncatalyzed process.

EXAMPLES

Example A

To carry out the liquefaction experiments, an autoclave reactor with temperature control was used. The moisture content of the biomass was determined and about 10 g of this material, on a dry basis, was added to the reactor. The amount of water was calculated by taking the water already present in the biomass into account. After loading water and biomass, the reactor was closed and purged with nitrogen.

Then the reactor was pressurized at 100 bar (10 MPa) for 1 h to check for tightness. After this step, the reactor was heated to the desired temperature. The residence time was counted from the moment the test temperature was reached. After the reaction time had elapsed, the heating was switched off and all thermal insulation was removed for fast system cooling. Conversion (X) (degree of liquefaction) and yields (Y) of bio-oil (BO) and char are calculated according to the equations below.

$$X(\%) = \frac{Mbagaço - Mchar}{Mbagaço} \cdot 100$$

$$Y_{BO}(\%) = \frac{M_{BO}}{Mbagaço} \cdot 100$$

$$Y_{char}(\%) = \frac{Mchar}{Mbagaço} \cdot 100$$

where M is the mass of the material.

Non-Catalyzed Hydrothermal Liquefaction

The non-catalyzed hydrothermal liquefaction tests were performed at 300° C. with 0 min residence time. The heating ramp time for this system was 60 minutes. After the first test, the aqueous fraction was separated and reused in the second test. The same procedure was performed for the third test.

It can be noted in Table 1 that, in the first test, a conversion close to 80% is achieved, with a bio-oil yield around 27%. However, with the reuse of the aqueous fraction, the conversion drops drastically, to levels of around 60%, which means an increase in the char yield to 20% in the first reuse and to 40% in the second reuse. Such effect is attributed to the presence of organic acids in the aqueous fraction, which can catalyze the formation of char. However, can be noted that the bio-oil yield is not affected by the recycle of the aqueous stream, remaining stable at 27%.

TABLE 1

| CATALYST | BIO-OIL YIELD (%) | | | CONVERSION (%) | | | CHAR YIELD (%) | | |
| --- | --- | --- | --- | --- | --- | --- | --- | --- | --- |
| | INITIAL | $1^{st}$ REUSE | $2^{nd}$ REUSE | INITIAL | $1^{st}$ REUSE | $2^{nd}$ REUSE | INITIAL | $1^{st}$ REUSE | $2^{nd}$ REUSE |
| NON-CATALYZED PROCESS | 27.2 | 26.6 | 27.0 | 82 | 58 | 61 | 18 | 42 | 39 |

Example B

In example B, the same procedure detailed in example A was used, except for the use of the catalyst in the proportion of 5% m/m of the biomass on a dry basis, prepared from castor bean hull.

The catalyst was generated by means of the calcination of castor bean hull (7% inorganic content), in air flow at 600° C. for 6 h. The resulting product presented the composition of the table below, obtained by X-ray fluorescence technique.

TABLE 2

| ORDER | ANALYTE | RESULT | UNIT |
|---|---|---|---|
| 1 | K | 51 | % |
| 2 | Ca | 6.9 | % |
| 3 | Si | 4.4 | % |
| 4 | Al | 2.6 | % |
| 5 | Fe | 2.2 | % |

It can be noted in Table 3 that, with the use of the catalyst, the initial conversion reaches a value of more than 90%, while the bio-oil yield reaches 36%. These values are higher than those observed for the non-catalyzed system (example A) and show the role of the catalyst in this reaction.

With the reuse of the aqueous fraction the yield of bio-oil rises to 43% and then to a value greater than 45%. This increase in the bio-oil yield indicates that the catalytic effect is maintained and that the oxygenated products are reincorporated when the aqueous stream is recycled. In addition, a possible effect of the organic acids present in the aqueous fraction on the catalysis of the char formation is mitigated, which is evidenced by the small drop in conversion.

TABLE 3

| | BIO-OIL YIELD (%) | | | CONVERSION (%) | | | CHAR YIELD (%) | | |
|---|---|---|---|---|---|---|---|---|---|
| CATALYST | INITIAL | $1^{st}$ REUSE | $2^{nd}$ REUSE | INITIAL | $1^{st}$ REUSE | $2^{nd}$ REUSE | INITIAL | $1^{st}$ REUSE | $2^{nd}$ REUSE |
| PATENT CATALYST | 35.8 | 43.6 | 45.2 | 92 | 89 | 87 | 8 | 11 | 13 |

Figure 2:
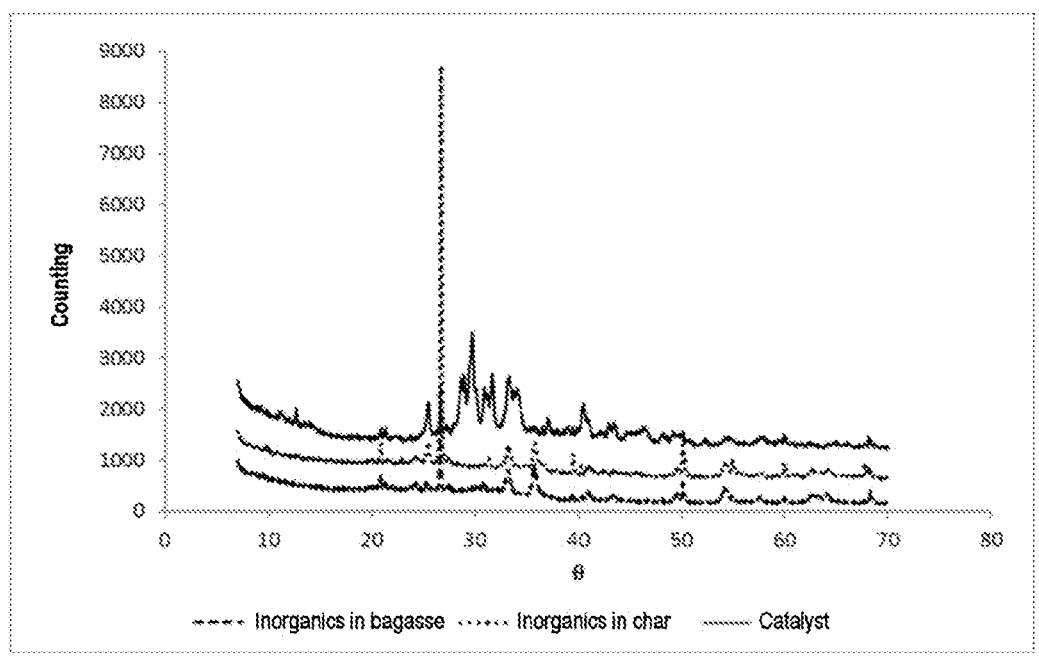
FIG. 2 presents a graph that addresses to the diffraction pattern of inorganics present in the solid phase, which come from bagasse and not from the catalyst. The results of the graph confirm that the recycling of the aqueous stream promotes the return of the catalyst to the reaction medium.

After the initial test, the generated solid fraction (char) was calcined and the inorganic residue obtained was submitted to an X-ray diffraction analysis in order to verify if the catalyst compounds were being concentrated in the solid residue. It can be seen in FIG. 2 that the diffraction pattern of the catalyst substantially differs from that observed for the inorganic compounds present in the char formed in the reaction, with the presence of catalyst. On the other hand, the diffraction pattern of the inorganics present in the char is very similar to that obtained for the inorganics present in the sugarcane bagasse. This observation leads to the conclusion that the inorganics present in the char come from the bagasse and not from the catalyst used in the test. The results corroborate the observation that the recycling of the aqueous stream promotes the return of the catalyst to the reaction medium.

Example C

In example C, the same procedure detailed in example B was used, however with the use of potassium carbonate PA as a catalyst. Table 04 shows a behavior similar to that obtained with the catalyst prepared from the calcination of castor bean hull. The results should be compared with examples A and B.

TABLE 4

| | BIO-OIL YIELD (%) | | | CONVERSION (%) | | | CHAR YIELD (%) | | |
|---|---|---|---|---|---|---|---|---|---|
| CATALYST | INITIAL | $1^{st}$ REUSE | $2^{nd}$ REUSE | INITIAL | $1^{st}$ REUSE | $2^{nd}$ REUSE | INITIAL | $1^{st}$ REUSE | $2^{nd}$ REUSE |
| PURE REAGENT CATALYST | 36.3 | 42.9 | 45.6 | 91 | 85 | 93 | 9 | 15 | 7 |

Table 05 summarizes the results obtained in examples A, B and C. It can be noted that the non-catalyzed process is the one with the lowest bio-oil yields and lower lignocellulosic raw material conversions. Furthermore, in this process, the reuse of the aqueous fraction allows the maintenance of the bio-oil yield at a stable level; however, the conversion undergoes a high reduction, with a concomitant increase in the yield of solid product (char).

With the use of the prepared catalyst, a significant increase in the yield of bio-oil can be noted, and the recycling of the aqueous phase allows, concomitantly, the reintroduction of the catalyst in the system, and also of organic compounds, so that the bio-oil yield is still high compared to what was initially observed.

Using the same process strategy, but with the use of a classic catalyst, there are obtained results that are very similar to those obtained with the prepared catalyst. However, it is worth to note that this catalyst is a highly pure reagent, unlike the catalyst presented in example B, which was prepared from lignocellulosic residues.

In this way, the advantages of using said catalyst together with the proposed process strategy remain clear, which can promote a high yield of bio-oil with lower catalyst cost and lower consumption of inputs.

TABLE 5

| CATALYST | BIO-OIL YIELD (%) | | | CONVERSION (%) | | |
| --- | --- | --- | --- | --- | --- | --- |
| | INITIAL | 1st REUSE | 2nd REUSE | INITIAL | 1st REUSE | 2nd REUSE |
| NON-CATALYZED PROCESS | 27.2 | 26.6 | 27.0 | 82 | 58 | 61 |
| PATENT CATALYST | 35.8 | 43.6 | 45.2 | 92 | 89 | 87 |
| PURE REAGENT CATALYST | 36.3 | 42.9 | 45.6 | 91 | 85 | 93 |

It should be noted that, although the present invention has been described in relation to the drawings and examples, it may undergo modifications and adaptations by technicians skilled on the subject, depending on the specific situation, but provided that it is within the inventive scope as defined herein.

The invention claimed is:

1. A method to produce crude bio-oil from lignocellulosic biomass with high moisture content, the method comprising:
    mixing water or a recycled aqueous stream with lignocellulosic biomass to form a mixture with solid content in the range of 5% to 20% by weight;
    adding a catalyst, generated from a residue of a biomass, to the mixture so that the catalyst concentration in relation to the lignocellulosic biomass is from 1% to 10% m/m to produce a second mixture;
    hydrothermally liquefying (HTL) the second mixture by heating the same to a temperature in the range of 250 to 300° C. and a pressure of 900 to 1300 psig (6.205 to 8.963 MPa) to produce reaction products;
    cooling the reaction products;
    sending the reaction products to a separator to produce separate gaseous, solid, oily, and aqueous streams containing the catalyst; and
    recycling the produced aqueous stream containing catalyst and soluble oxygen compounds to the mixing step.

2. The method according to claim 1, wherein the water, recycled aqueous stream, catalyst, and lignocellulosic biomass feed a liquefaction reactor configured to hydrothermally liquefy the second mixture.

3. The method according to claim 2, wherein the gaseous stream is recycled to the liquefaction reactor to maintain a reducing atmosphere or undergo a membrane separation process to obtain syngas.

4. The method according to claim 1, wherein the oily stream comprises renewable molecules.

5. The process method to claim 1, wherein the gaseous stream is configured to generate energy by total oxidation of the gaseous stream.

6. The method according to claim 2, wherein the aqueous stream is recycled to reuse the catalyst and reinsert water-soluble oxygenated compounds into the liquefaction reactor.

7. The method according to claim 1, wherein the solid stream is a raw material for the production of adsorbents.

8. The method according to claim 1, wherein the lignocellulosic biomass comprises:
    cellulosic material;
    lignin, obtained from sugarcane bagasse by means of the acid hydrolytic process;
    fatty material; or
    proteinaceous material.

9. The method according to claim 1, wherein the catalyst used is a homogeneous catalyst.

10. A catalyst for hydrothermal liquefaction of biomass streams as defined in claim 9, wherein the catalyst is obtained by calcination of residues from production of castor oil.

11. The catalyst according to claim 10, wherein the calcination is carried out at 600° C.

12. The catalyst as defined in claim 10, wherein a yield of bio-oil is increased by at least 30% compared to a non-catalyzed process responsive to using the catalyst.

13. The catalyst as defined in claim 10, wherein the catalyst comprises alkali metals.

14. The catalyst as defined in claim 10, wherein the catalyst is reusable.

15. The catalyst as defined in claim 10, wherein the catalyst is soluble in water, which makes the catalysts reuse possible and allows the method to recycle the entire aqueous fraction formed, reducing water consumption and increasing a yield of bio-oil by adding soluble oxygenated products and the catalyst in the aqueous stream to the second mixture.

16. The method according to claim 1, wherein the catalyst is a compound including mostly potassium.

17. The method according to claim 2, wherein the produced aqueous stream comprises the catalyst and some of the oxygenated products, the method further comprising: maintaining catalytic activity and increasing the bio-oil yield due to the incorporation of oxygenated compounds into the liquefaction reactor.

18. A bio-oil, obtained by the process as defined in claim 1, characterized in that it is an oily stream, comprising renewable molecules, with lower oxygen content, lower percentage of water, and lower acidity than the bio-oils obtained from pyrolysis processes without catalysts.

19. The method of claim 1, wherein the catalyst concentration in relation to the biomass is 5% m/m.

* * * * *